Fig. 1.

INVENTOR.
C. R. FINE
BY Darby & Darby
ATTORNEYS

Oct. 17, 1961  C. R. FINE  3,005,058
APPARATUS FOR USE IN PRODUCING SOUND MOTION PICTURE FILMS
Filed Nov. 23, 1955  5 Sheets-Sheet 3

INVENTOR.
C. R. FINE
BY
Darby & Darby
ATTORNEYS

INVENTOR.
C. R. FINE

BY Darby & Darby
ATTORNEYS

United States Patent Office 3,005,058
Patented Oct. 17, 1961

3,005,058
APPARATUS FOR USE IN PRODUCING SOUND MOTION PICTURE FILMS
Clarence Robert Fine, Tomkins Cove, N.Y., assignor to Fine Sound, Inc., New York, N.Y., a corporation of New York
Filed Nov. 23, 1955, Ser. No. 548,697
15 Claims. (Cl. 179—100.3)

The present invention is related to the art of production of sound motion picture films and is more particularly concerned with methods and apparatus useful in the preparation of the ultimate release print of a motion picture film to be displayed in a theatre.

In making a motion picture film according to present techniques, the scenes for a complete picture are very fragmentary, the majority of them being less than a minute and a half in duration as compared to a total feature film duration of 90 minutes to 3 hours, thereby producing many short sections of film which must be combined into the finished complete film. Furthermore, in any one scene there may be several retakes, to allow for different camera angles, thereby increasing the number of sections further.

In taking a scene the general procedure is to protograph the scene while simultaneously making a separate synchronous sound recording, permitting the picture film to be developed independently of the sound track for flexibility in editorial combination. Because of the important advantages in the use of magnetic recording, resulting in high quality, freedom from defects resulting from photographic laboratory handling and lowered inherent noise level as compared with optical sound track, it has become nearly standardized practice to relay upon magnetic sound recording.

Such use of magnetic sound recording has created problems of synchronization of each section of photographic film with its corresponding section of magnetic sound track. In the final release print the sound track is of an optical nature (either variable-density or variable-area type) which is photographically printed simultaneously with the photographic film from a master print which is assembled from the desired sections. In order to achieve the proper synchronization in the ultimate release print, it is obviously necessary for the magnetic sound track (or a re-recorded replica of it) to be aligned properly with the motion picture film.

Since the recording on the magnetic track is invisible, it is impossible to make such an alignment without reproducing the sound track from the magnetic tape, which in turn, means that the tape must be in motion to determine the specific sound effect which is to be aligned with a specific picture frame. This creates considerable difficulties in developing and utilizing suitable procedures and techniques.

Accordingly, it becomes necessary to provide an optical version of the recorded sound which can be visually aligned with the required picture frame while both are stationary. For example, an experienced technician can recognize from an optical sound track various types of sound, such as an abrupt change of volume, a crash, a sudden cessation of sound, etc., which will correspond to events visually apparent on the corresponding photographic picture portion of the film, permitting alignment of sound and picture.

This has previously been done by combining a photographic optical track and a magnetic track on a single strip of sprocketed film. Such a film contains the optical track and magnetic track directly in side-by-side alignment with each other, the optical track simplifying the editorial work of alignment and synchronization by its visibility and the related magnetic track being available for high quality use through re-recording. However, this method has proved to be quite cumbersome due to the necessity for photographic developing of the film by normal laboratory procedures in order to produce the optical sound track. Not only are these procedures expensive, but they are time consuming, requiring 24 to 48 hours in the usual case, thereby preventing immediate synchronized examination of the desired fragments of the motion picture as they are taken.

According to the present invention, the disadvantages of the former methods are overcome by the use of a method and apparatus providing a direct combined optical and magnetic recording of sound. This can be done directly as the scene is being taken or by recording from a magnetic tape having synchronizing indicia corresponding to similar indicia on the picture itself. Furthermore by the present invention it is possible to synchronize a plurality of magnetic tracks (which for example, might separately constitute recordings of dialogue, musical background effects, and sound effects) with a single optical track, which, as desired, may be a combination of magnetic tracks or may represent any one of them. This is done by the provision of special engraving-type apparatus for producing an optical sound track fixedly synchronized with a magnetic sound track and side by side with it.

Further features of the present invention reside in the special means in ultimately assuring synchronization of the optical track with a magnetic sound track or tracks, and automatic means for avoiding improper recording or injury to the engraving apparatus when the film is stationary or the machine has broken down. Other features of the present invention reside in the provision of special means for assuring sharp clean engraving of the film.

According to a further feature of the present invention, an automatic disengage system is provided for the engraver to move the engraving tool or stylus away from the film or the drum on which the film runs, in the absence of any signal being supplied to the engraver and interlocked with the drive motor of the apparatus so as to be disengaged both during the absence of signals and during the stationary condition of the motor. Furthermore upon film breakage, an automatic disengagement is effected.

According to the present invention the missing link between the magnetic recording taken originally and the ultimate master print is provided by the use of a high quality optical sound track engraver which can be used immediately with an optical reproducer as a means for both visually and aurally checking the sound associated with the picture, and permitting the sound track film of the present invention to be used instantly and either optically or magnetically for editorial purposes, monitoring preview or the like.

The present apparatus uses a film stock or blank for sound recording which on a preferably standard-width sprocketed transparent film has a continuous lengthwise strip of magnetic recording material side by side with another strip of opaque coating on the transparent film base. Because the sound recording film is intended to be used primarily for high quality magnetic reproduction, as in mixing or combining sound tracks preliminary to making the master print, the original recording or re-recording from the original record is performed on the magnetic track in accordance with established high quality procedures in a separate chamber of the machine. The film then passes into the engraving chamber which has a magnetic reproducing head side by side with an engraving head. The magnetic reproducing head, of course, cooperates with the magnetic track while the engraving track is aligned with the opaque-coated strip. The magnetic reproducing head picks up the sound signals from the magnetic sound track and supplies them to the engraving head through a suitable amplifier system and noise-reduction unit. The engraving head substantially instantaneously cuts away the opaque coating in the desired variable-area pattern representing the same recorded signal. Because of the separate location of the magnetic recording track, spaced from the opaque coated strip, the quality of the magnetic track is completely unaffected by the engraving operation. The film produced therefore has an optical sound track of the variable area type side by side and aligned with a magnetic sound track with the same signals recorded therein. The motion picture producer therefore encounters no delay in laboratory processing and has the sound tracks available immediately for both optical and magnetic use.

Other objects and advantages of the present invention will become apparent from the following description of a preferred embodiment thereof, taken in conjunction with the appended drawings in which.

Figures 7, 8, 9, 10:
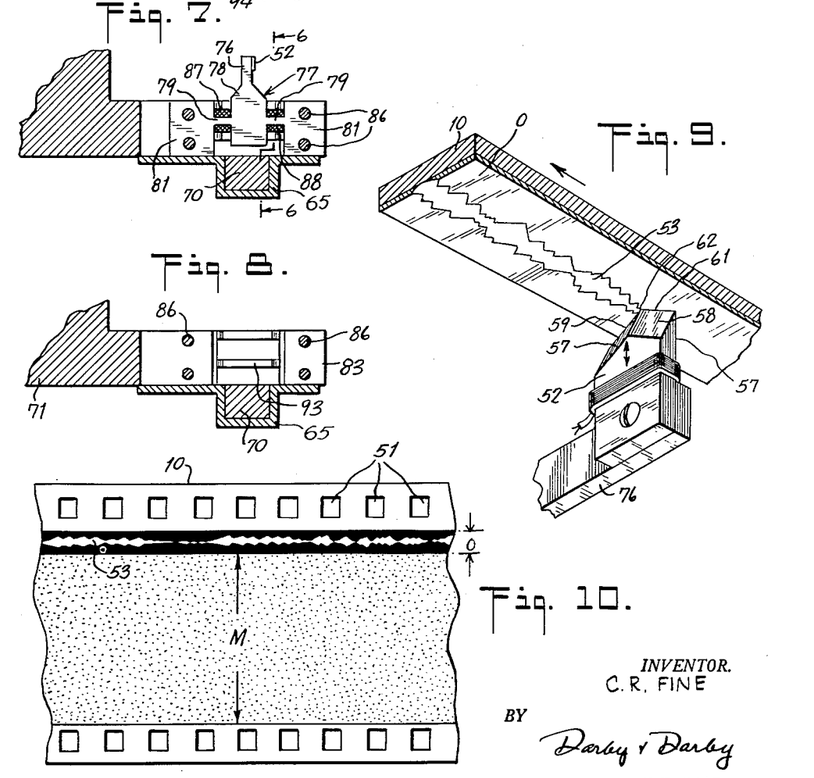
FIGS. 7 and 8 are respective fragmentary plan cross-sectional views of the device of FIGS. 5 and 6, viewed along lines 7—7 and 8—8 respectively of FIG. 5.
FIG. 9 is a fragmentary perspective view of the film stock and optical recording stylus of the apparatus of the invention.
FIG. 10 is a fragmentary plan view of a portion of the recorded film.

Referring to the drawings, FIG. 10 shows a plan view of the special film blank or stock 10 of the present invention. This film stock is preferably of standard motion picture width (for example, 35 or 16 millimeters), having suitable sprocket holes 51. The film base is preferably transparent, and a major portion of its width, indicated at M is suitably coated for the entire length of the film blank with magnetic recording material of conventional type, so as to permit conventional magnetic recording on this portion of the film width, in any desired or convenient number of channels or tracks. In addition, on another portion of the film along side the magnetic strip M, there is a continuous strip coating O of an opaque material such as a black lacquer. This coating is made as thin as practicable while maintaining its opacity, and in accordance with the present invention an optical sound track is recorded on this opaque track O by means of a recording stylus which cuts away the black opaque coating 53 with variable width of cut to produce a variable-area optical sound track 53 as described below.

The apparatus of the present invention is shown in FIGS. 1 to 9.

Figure 1:
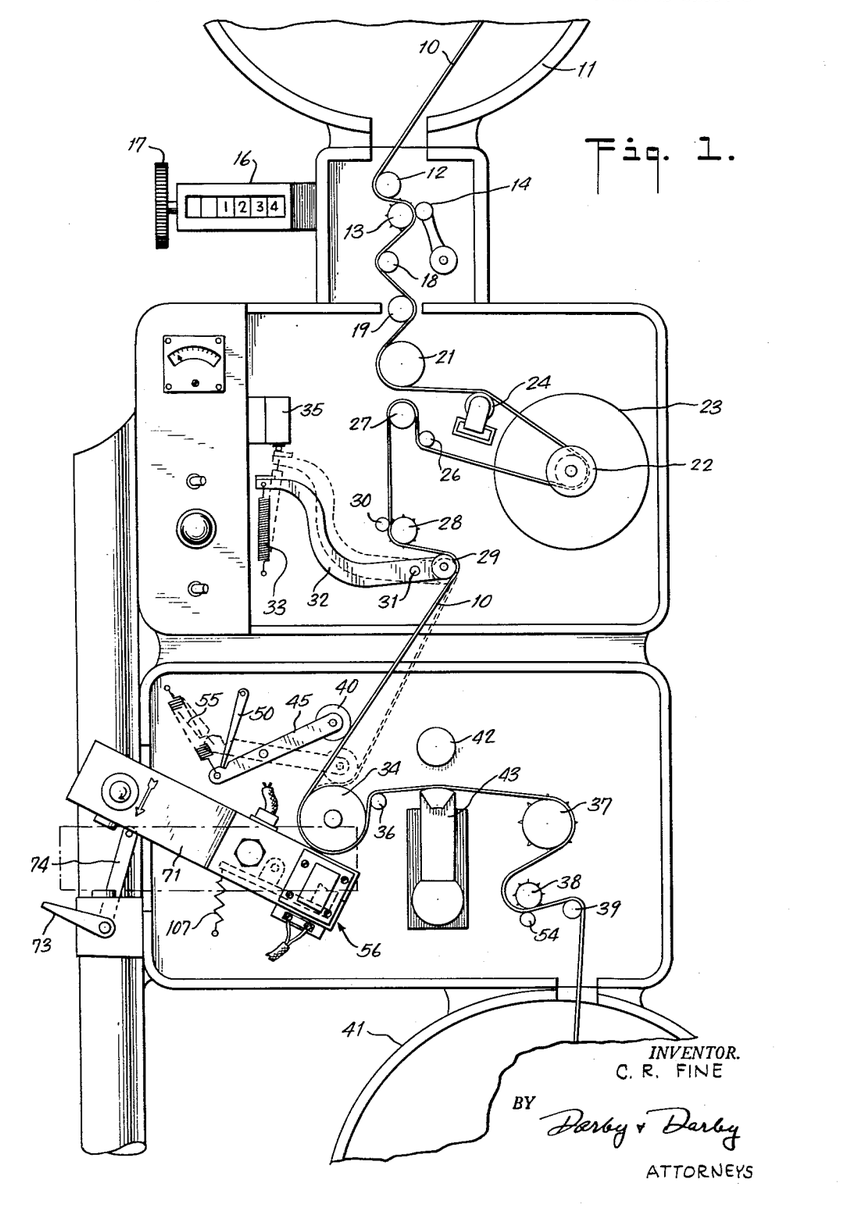
FIG. 1 shows a front elevation view of the apparatus of the present invention with the covers removed to show the mechanism involved.

The blank film stock 10 is mounted on a suitable reel, not shown, in the supply magazine 11 from which it is fed over an idler wheel 12 to a drive sprocket 13 having a pressure roller 14 maintaining the film 10 in contact with the projections of the sprocket 13. A counter 16 of any suitable type may be coupled to the drive sprocket 13 to count the number of frames or other units of length of the film passing over the sprocket 13. A knob 17 may be provided for re-setting the counter 16 as desired. The blank film 10 then passes over further idler pulleys 18 and 19 and 21 and around the anti-flutter drum to pass over a magnetic recording head 24 of suitable conventional design.

Preferably this recording head is of the multiple-track type which can record, for example, three or four separate magnetic sound tracks on the magnetic coating M of the film 10.

The film 10 then passes over a further anti-flutter idler pulleys 26, 27 to a drive sprocket 28 synchronized with sprocket 13. A keeper pulley 30 keeps film 10 engaged with sprocket 28. The film then passes over a film break idler pulley 29 pivotally mounted on an arm 32 which is pivoted at 31, on the frame of the machine, arm 32 being resiliently urged by a spring 33 in a counter clockwise direction. This action of the spring 33 is opposed by the action of the tension of film 10 on idler 29, which normally maintains arm 32 in engagement with film-break micro switch 35. Should the film break or its tension slacken beyond a desired point, spring 33 moves arm 32 away from switch 35 to cause disengagement of the engraving stylus as described below.

The film 10 then passes around the engraving drum 34, and under the heavy idler pulley 40 which is mounted on a pivoted lever arm 45 whose other end is resiliently biased by a spring 55 to maintain high pressure on film 10 by pulley 40. A hold arm 50 serves to keep pulley 40 away from engraving drum 34 during loading or non-use. The film then passes over the guide idler pulley 36, and by the optical monitoring pick-up 43 aligned with the optical track 53. A light source 42 projects a light beam through track 53 to a suitable photoelectric pick-up in device 43 for monitoring the optical sound track, as described below. The film then passes over take-up drive sprocket 37, feed magazine sprocket 38 with guide pulley 54 and idler pulley 39 to a take-up reel (not shown) in take-up magazine 41.

In FIG. 1 the engraving head 56 is shown disengaged from engraving drum 34, in the loading position. Also, the film-break arm 32 is shown in the film-break position, with switch 35 tripped. The dotted line shows it in operative position. Similarly, heavy idler 40 is shown disengaged, the engaged positions being shown in dotted lines.

Figure 2:
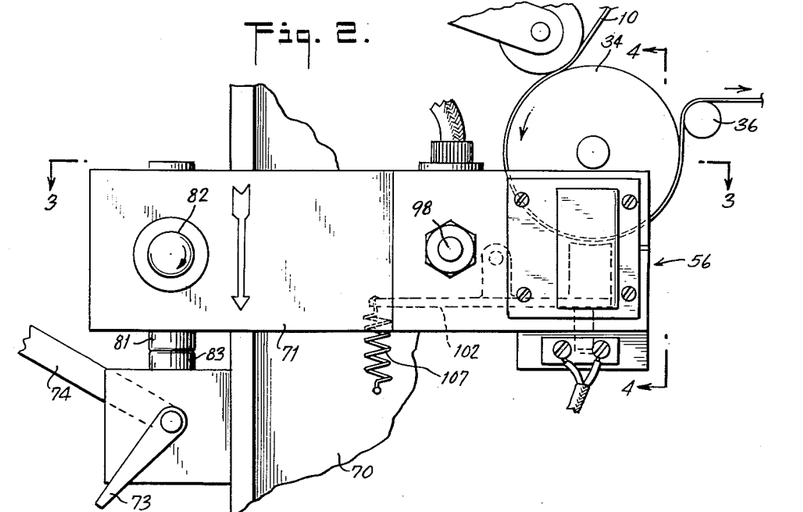
FIG. 2 is an enlarged fragmentary front elevation view of the optical recording portion of the apparatus, in operative position.
Figure 3:
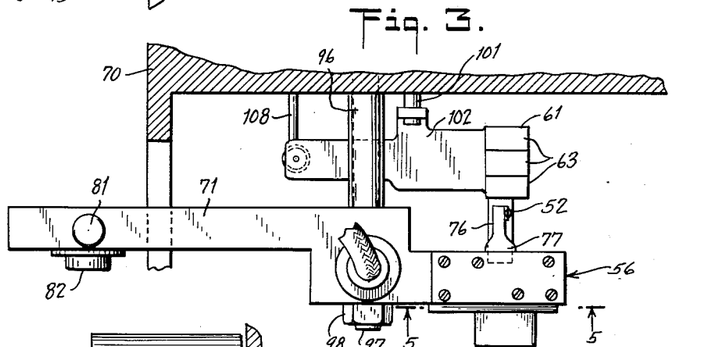
FIG. 3 is a fragmentary top view of the apparatus of FIG. 2 viewed along line 3—3 of FIG. 2.

The structure of the mounting for the engraving head 56 and its associated apparatus is shown most clearly in FIGS. 1 to 4. The engraving head 56 is mounted on a massive lever arm 71 pivotally mounted at 72 from the frame of the apparatus. In the disengaged position shown in FIG. 1, a prop 74 with an operating handle 73 holds lever 71 with head 56 away from drum 34. FIG. 2 shows lever 71 and head 56 in recording position.

At the right end of the lever 71 as viewed in FIGS. 1 and 2 is the engraving head 56 including the recording stylus 52 and its actuating mechanism described below. At the left end of the lever 71 is a micrometer arrangement with a plunger 81 and an actuating knob 82. The plunger 81 cooperates with a stop 83, and by means of the knob 82 plunger 81 is caused to project or retract as desired to position the tip of the stylus 52 in proper relation to the film 10. The left portion of the lever 71 is suitably massive or weighted to provide the required cutting pressure on the stylus 52. The micrometer arrangement permits extremely accurate positioning of the cutting tip of stylus 52 as required for accurate recording. An adjustment is provided as described below for moving engraving head 56 laterally of the film 10 so as to position the stylus 56 in relation to the optical track O.

As shown in FIGURE 9 the recording stylus 52 has a flat surface 56 and two slanted surfaces 57, 58 forming two knife edges 59 and 61 which have a large subtended angle, for example, 174 degrees, there-between. As a result it will be appreciated that when only the extreme point 62 of stylus 52 is cutting away the opaque coating to form the transparent optical track, the width of that track (formed by the transparent film section exposed by removing the opaque coating) will be very narrow. By virtue of the broad tip angle of the stylus 52, a very slight longitudinal movement of the stylus 52 transverse to and into the film blank 10 will cause the stylus 52 to cut away considerably more of the opaque coating, providing a much greater width for the optical track. By vibrating the stylus 52 in correspondence with the instantaneous variations in amplitude of an electrical sound signal, the optical sound track produced by the stylus 52 will be an accurate facsimile of that electrical signal.

The construction of the recording or engraving head 56 which serves to actuate the stylus 52 in the manner just described, is shown particularly in FIGURES 5 to 8. The stylus 52 is secured to the end 76 of an armature 77. As shown in FIGURE 7 the armature 77 is formed integrally of one piece, having a main body 78 connected to the end 76 with a pair of narrow torsion or bending sections 79 projecting laterally therefrom to the edge of each which is joined a mounting tab 81. The two mounting tabs 81 are clamped between the face 82 of a portion 83 of lever 71 and a block 84, as by means of suitable screws 86.

Encircling the main body 78 on one side of the torsion sections 79 is a flat pancake coil section 87. A second similar coil section 88 surrounds the main body 78 on the other side of the torsion section 79. Surrounding the coils 87 and 88 is a magnetic core formed of two sections 89 and 91 having two pairs of pole-pieces 92 and 93. Core sections 89 is secured on an extension 73 of lever 71 while core section 91 is secured to the block 84, as by suitable screws 94. A permanent magnet 70 is held against the core sections 89, 91 by a holder 65 and provides a constant magnetic field between the pairs of pole-pieces 92, 93.

It will be understood that the coil sections 87 and 88 are connected in series or parallel to have the sound signal currents pass therethrough, to produce fluctuating magnetic fields which create opposing forces on the armature body 78 on either side of the bending sections 79. The resilience and elasticity of the bending sections 79 provide a linear restoring force opposing the magnetic forces to give accurate linearity of recording. Any small existing non-linearity may be compensated by compensating networks in the circuit supplying coils 87, 88.

The lever arm 71 is pivotally mounted from the frame 70 on a pivot axis 96 having a threaded extension 97. A threaded nut 98 with a suitable locking arrangement permits axial adjustment of the lever arm 71 on pivotal axis 96 to provide an adjustment of stylus 52 across the width of the film 10 to permit proper positioning of stylus 52 relative to the opaque-coated strip O.

Figure 4:
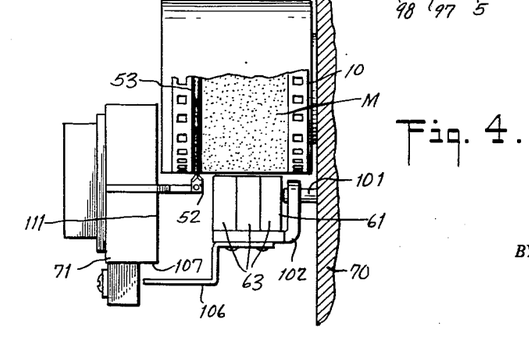
FIG. 4 is a side elevation view of the apparatus of FIG. 2 viewed along line 4—4 thereof.
Figure 5:
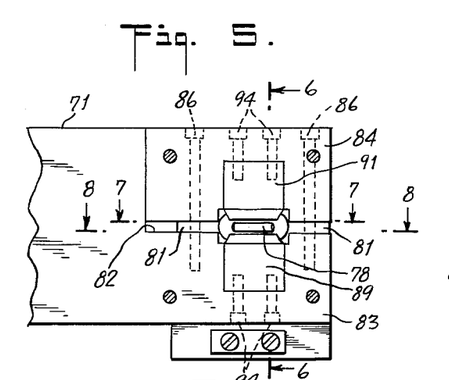
FIG. 5 is an enlarged front fragmentary view of the optical recording head partially disassembled.
Figure 6:
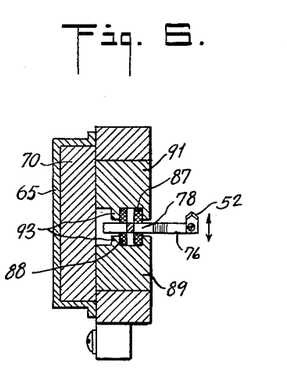
FIG. 6 is a side elevational cross-sectional view of the device of FIG. 5 seen along line 6—6 thereof.

Also pivotally mounted from the frame 70 by a pivot 101 is an arm 102 which at one end carries the magnetic pick-up or reproducing head 61 which, as shown most clearly in FIGURE 4, is laterally displaced from the stylus 52 to cooperate with the magnetic track area M of the film blank 10. As shown the magnetic reproducing head may have three side-by-side sections 63 as in the case where the magnetic area of the film is divided into three tracks for three separate recordings. An arm 106 is secured to the reproducer head carrying arm 102 and extends in the path of the lever 71, so that when the engraving head 56 is disengaged from the engraving drum 34 by being lowered about the pivot axis 96, the edge 107 of lever arm 71 will engage arm 106 and will pivot the pick-up carrying arm 102 about its pivot 101 to disengage it also from the film blank 10. As shown in FIGS. 1 and 2 a tension spring 107 has one end engaging the frame and the other end engaging the arm 102 to restore the pick-up head 61 to operative position when the engraving head 56 is put in recording position. A suitable stop 108, which may be made adjustable in any suitable manner, is provided to assure that the pick-up head 61 is in proper closely spaced relationship to the film blank 10 during operation.

Surrounding the stylus 52 is a heater coil 111, which is energized in the manner described below to provide heat at the cutting tip of stylus 52. This heat serves to soften the material being cut away during the engraving operation producing the optical recording, so as to provide smooth edges for the optical track 53.

Figure 11:
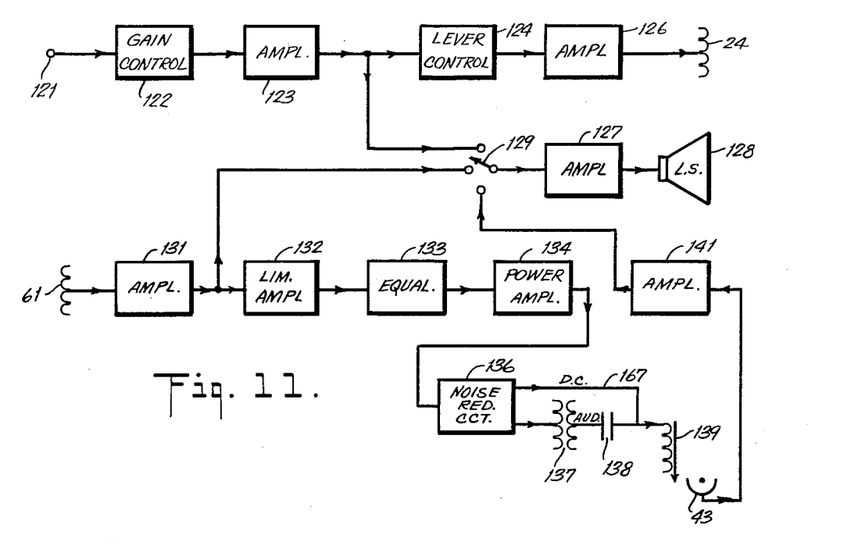
FIG. 11 is a schematic circuit diagram for the signal circuits, mainly in block form.

FIGURE 11 shows in schematic form the general circuit diagram for the signal currents. Signals to be recorded are impressed on the input terminal 121 and proceed through a master gain control 122, a line amplifier 123, a recording level control 124, and a magnetic recording amplifier 126 to the magnetic recording head 24. A monitor amplifier 127 and monitor speaker 128 may be coupled through a selector switch 129 to the recording level control 124 when it is desired to monitor the signal being supplied to the magnetic recording head.

The magnetic pick-up head 61 which reproduces the signal recorded by head 24, supplies its output through a magnetic play-back amplifier 131, a limiter amplifier 132, an equalizer 133, a power amplifier 134, a noise-reduction circuit 136, a coupling transformer 137, and a coupling condenser 138 to the engraving head coils 87—88 indicated schematically at 139. The output of the magnetic play-back amplifier 131 is supplied to the central terminal of selector switch 129 to permit monitoring of the magnetic pick-up signal when desired. The magnetic recording amplifier 126 also supplies the required supersonic bias voltage for the recording head 24.

The purpose of the limiter amplifier 132 is to limit the excursions of the stylus 52 so as not to enter into a region in which the relation between engraving amplitude and input voltage may be non-linear. The equalizer 133 compensates the input signal for any non-uniform frequency response of the engraving system.

The audio current or signal being recorded passes then through the noise reduction circuit 136 through the coupling transformer 137 and coupling condenser 138, whose purpose is to prevent direct current also supplied from the noise reduction circuit 136 to the engraver 139 from returning to the coupling transformer 137 where it might cause saturation or other undesirable effects. For the purpose of monitoring the optical sound track produced by the engraver 139, a photoelectric pickup 43 responding to variations in intensity of light passing from the light beam source 42 through the optical sound track provides an audio signal which is amplified at 141 and supplied to the lowest terminal of selector switch 129 to permit monitoring of the engraved optical sound track when desired, thus providing means for aurally checking the quality of the optical sound track.

Figure 12:
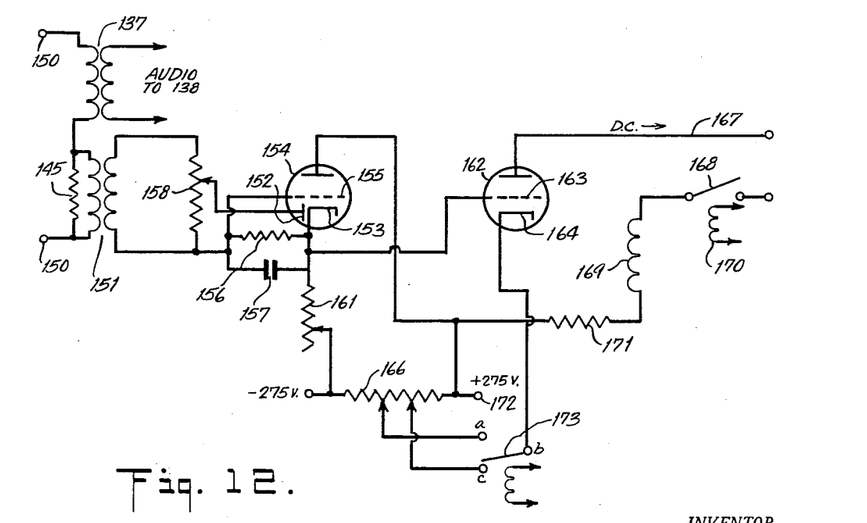
FIG. 12 is a schematic circuit diagram of the noise reduction amplifier and control circuit.

The noise reduction amplifier circuit is shown schematically in FIGURE 12. The input transformer 151 is connected in series with the coupling transformer 137 of FIGURE 11 to provide a small amplitude audio voltage for application to the noise reduction system. The secondary of transformer 151 is coupled to the anode 152 and cathode 153 of a first diode of a double-diode-triode tube 154, in series with a load resistor 156 shunted by a by-pass condenser 157. An input amplitude adjustment is provided by a potentiometer 158. The voltage appearing across the load resistor 156 is impressed between the cathode 153 and control grid of the triode section of tube 154. The amplified output of tube 154 then appears across a load resistance provided by series-connected resistors 161. The second tube 162 has its control grid 163 coupled directly to the cathode 153 of first tube 154. The cathode 164 of tube 162 is connected to a voltage divider 166 to have, for example, a bias of minus 100 volts between grid 163 and cathode 164. In the absence of input signal the voltage across diode resistor 156 will be zero and accordingly the anode current of tube 154 will be a maximum causing a volt drop across its load resistors 161 which oppose the 100 volt bias just referred to. This permits an anode current to pass through tube 162. In one example, this current was of the order of 30 milliamperes. Resistors 161 provide fine and course adjustments for the value of this anode current, which is supplied by way of lead 167 to the coils 87, 88 of the engraving head.

The anode circuit of tube 162 is completed through the engraving coils 87, 88, the noise reduction switch or relay 168 when in a closed position, a filtering reactor 169 and a current-limiting resistor 171 back to the positive terminal 172 of the plate potential supply across which voltage divider 166 is connected.

Thus in the absence of any audio signal, a relatively large direct current passes through the engraving head coils. This current is adjusted in relation to the forces urging the engraving stylus toward the engraving drum 34 and the setting of micrometer 81 so that only the very tip of the stylus 52 engages the opaque-coated optical track, so that the recorded optical track is a very narrow slit. This is a desirable condition with low amplitude signals since a wide track under low amplitude conditions more readily permits the undesired introduction of extraneous noise impulses by way of scratches or spots on the transparent track 53 itself.

As the audio signal increases in average amplitude, this signal is supplied to transformer 151 and is rectified by the diode 152, 153 to increase the negative voltage produced across resistor 156, which in turn cuts down the current through load resistors 161 and causes the net voltage on grid 163 relative to cathode 164 to become more negative. This decreases the plate current of tube 162, and accordingly reduces the direct current bias through engraver coil 87, 88 thereby causing the stylus to take a deeper cut from the film 10 to produce a wider track. Hence the stronger the signal, the wider the sound track will be. This effect is of course independent of the instantaneous fluctuations of the audio signal, which are eliminated by the rectifier action and the time constant in the rectifier load circuit.

Figure 13:
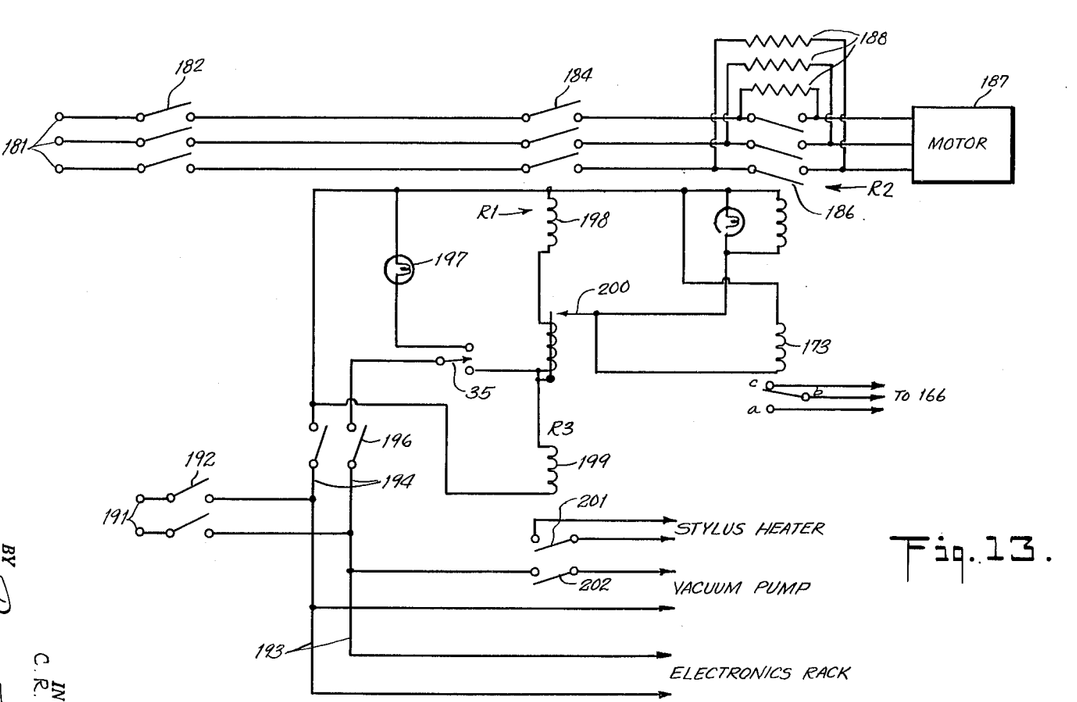
FIG. 13 is a schematic circuit diagram of the motor and other controls of the present invention.

An important and novel feature of the present circuit is the provision of automatic means for disengaging the cutting stylus when the apparatus is not in engraving condition. This is shown in FIGURE 13, in conjunction with FIGURE 12, FIGURE 13 showing the motor relay circuit and controls for the present system. As shown in FIGURE 12, positioned in the grid-cathode circuit of tube 162 is a relay-operated switch 173 which in the lower position provides the normal operating potential by connecting to the cathode 164 to a point of voltage divider 166 producing the required bias for normal operation, for example, 100 volts. When the relay switch 173 is de-energized, which as shown below is done in response to certain conditions in the motor control circuit, the relay switch 173 moves to its upper position in which increased bias such as plus 150 volts is impressed between cathode and grid, causing a much larger plate current from tube 162 to be supplied to the engraving coils. This increase in direct current causes the armature of the engraving head to move away from the surface of the film blank sufficiently to disengage the stylus completely from the film blank itself. As will be shown, this high current bias is not removed until such time as the motor driving the film is operating at normal speed.

Referring to FIGURE 13, the three-phase power source indicated schematically by terminals 181 is supplied through a circuit breaker 182, fuses 183, the contacts 184 of relay R1 when closed, and the contacts 186 of relay R2 when closed, to the drive motor 187. Shunting the contacts of relay R2 are a set of starting resistors 188. These resistors reduce the torque of the motor 187 during starting to prevent tearing of the film due to normally high tension in the engraving chamber of the apparatus.

Also provided is a second source of power indicated as a single-phase 110-volt alternating power supply connected to terminals 191, which through a main power switch 192 supplies power to various control and energizing circuits. One branch 193 of this power circuit proceeds to the various electronic circuits for energization thereof. A second branch 194 proceeds through a motor start switch 196, a film-break pilot light 197, and a switch 35 shown in FIGURE 1 to the coil 198 of relay R1. Accordingly, provided that there is proper tension on the film 10 so that switch 35 is closed, relay coil 198 of relay R1 is energized thereby causing its contacts 184 to supply power to the motor 187 through the starting resistors 188. The motor then picks up speed with low torque to start the apparatus in operation. Simultaneously the coil 199 of relay R3 is excited, which closes contacts 201 for the stylus heater circuit, and also closes contacts 202 for a vacuum pump arrangement cooperating with a suction tube (not shown) mounted adjacent to stylus 52 for picking up the waste material from the engraving process. Simultaneously the thermal-delay switch 200 is energized, having a delay of approximately 2 seconds, during which time the motor picks up to full speed, whereupon relay R2 becomes excited to short out the starting resistors and permit the drive motor 187 to operate normally. The two-second delay allows for overcoming the inertia of the machine and its associated drums and sprockets slowly before applying the full torque of the drive. The relay 173 of FIGURE 12 is connected to switch 200 in such manner that it is not excited until switch 200 closes its contacts. In this way the large current bias whch maintains the stylus away from the film as described with respect to FIGURE 12 is kept in effect until the motor is operating at full speed whereupon relay 173 reduces the bias on tube 162 to reduce this current bias for the engraving coils to the required value.

The contacts 201 of relay R3 introduce a portion of the current from the exciter lamp 42 through a resistance and ammeter to a heater winding about the stylus 52 thereby heating the stylus point to approximately 400° F., which sharpens the engraved wave form as produced by the engraving head, and increases the signal-to-noise ratio while reducing the distortion of the engraving.

The operation of the apparatus of the present invention will now be clearer. The engraving head 56 is normally kept in the position of FIG. 1 when loading or unloading the apparatus, or when not in operation. To commence operation, after the film stock is threaded into place in the manner shown, the main power switches 182, 192 are closed and the engraving head 56 is then swung into operative positions as shown at FIG. 2. At this time, the noise reduction amplifier circuit of FIG. 12 is energized over leads 193 of FIG. 13, and since relay 173 is de-energized (in the upper position) high D.C. bias is supplied by tube 162 to the engraving head coils 87, 88 to maintain the stylus 52 out of contact with the opaque coating O.

The motor start switch 196 is now closed, which initiates a number of actions. First the relay R1 is energized (provided safety switch 35 is closed) to close its contacts, whereby motor 187 starts through starting resistors 188. At the same time, time delay switch 200 is energized and after the prescribed time delay closes both to energize relay R2 to short out resistors 188 by contacts 186 and also to actuate relay 173 to apply normal bias current to the coils and permit the stylus to act upon the opaque coating. Thereupon normal recording ensues, with noise reduction control as described.

In addition, the motor start switch energizes relay R3 whose contacts 201 and 202 energize the stylus heater and vacuum pump.

In recording the single or multiple track signals to be recorded are supplied to the magnetic recording head 24 and create a magnetic sound track on the film 10. This magnetic sound track passes before the magnetic pick-up indicated at 61 in FIGS. 3 and 4, which picks up and reproduces the signal recorded on the magnetic portion of the film. This reproduced signal is then supplied to the engraving stylus 52 located at substantially the same position along the film as the pick-up head 61 to provide the optical sound track 63. Thus as described above, the resulting recorded film bears the magnetic sound track and the optical sound track side by side. Where the magnetic sound track is plural, the optical sound track is either a replica of one of the magnetic tracks or a composite of all of the magnetic tracks, as desired.

The present apparatus is also intended for use in the synchronization of sound with animated films. Such animated films are made or drawn generally after the sound track has been recorded so that the animation can be synchronized to the previously recorded sound. In common practice, a separate drawing or photograph is made for each frame of the animated picture. On standard motion film there are exactly 4 sprocket holes to each frame, and the animator, in order to properly determine the relationship of the sound track to the number of frames of picture which the recorded sound represents, must generally mark each fourth sprocket hole to show where each frame begins and ends.

According to the present invention such an animation framing signal can be automatically included. The film travels at 90 feet per minute; with 4 sprocket holes per frame, the frequency of the frames is 24 cycles per second. A pulse signal generator having a repetition frequency of 24 pulses per second may be connected so as to super-pose its signal upon the signal supplied to the engraving head. This animation framing signal would produce a high-amplitude visible pulse repetitively along the optical sound track at intervals exactly correlated to the individual frames so as to give the required guide for the animator.

The present invention can also be readily used to provide an automatic synchronizing start mark. It is common practice in current film techniques where the sound track and picture are separate until the final stage of recording and preparation of the master print from which release prints are made, to provide some keying mark indicating the starting point for both the sound and the picture. This has been generally accomplished by punching a hole or series of holes in the film at a given distance from its start, most generally nine feet from the the starting point of the film. These holes are formed both in the picture frame of the film itself and in the sound track; therefore as the sound track is reproduced a loud audible "bloop" is formed and when the film is projected the white dots are seen. By making the visible white dots coincide with the "bloop" is is insured that the optical and audible media are synchronized at the beginning.

According to the present invention, the "bloop" may be automatically appled both to the optical and magnetic tracks of the film of the present invention by providing a circuit which will impress an electrical signal corresponding to the "bloop" on the input terminal 121 a preset time interval after the start of the motor, thus automatically giving the editor a starting mark when intercutting the scenes and sound of a motion picture.

In some situations, the physical proximity of the engraving head 139 (FIG. 11) to the magnetic pickup head 61 may cause high-frequency feedback between them, especially. To minimize undesirable effects or distortion of such feedback, a relay may be provided with contacts connected across terminals 150 of FIG. 12 and with its coil in parallel with relay coil 173 in FIG. 13, so that these contacts remain closed until after the time delay of switch 200, and thereafter open to permit normal operations.

It will be understood that the foregoing description is intended to be illustrative only, and is not to be taken in a limiting sense, the actual scope of the present invention being defined solely by the appended claims.

What is claimed as the invention is:

1. Sound recording apparatus comprising means for continuously translating a magnetically and optically recordable film blank web, means including a magnetic recording head at one position along the path of said web for magnetically recording electrical signals on said web, means including a magnetic pickup head at a predetermined position along the path of said web displaced from said recording head in the direction of motion of said web and in operative relation thereto for reproducing electrical signals corresponding to said magnetically recorded signals, recording means at the same said position along the path of said web as and in side-by-side relation to said pickup head and in operative relation to said web for making an optical recording of electrical signals on said web, and means coupling said pickup head to said recording means for supplying said reproduced electrical signals to said optical recording means.

2. Sound recording apparatus comprising means for continuously translating a magnetically recordable and engravable film blank, a magnetic recording head at one position along the path of said film blank, a magnetic pickup head displaced from said recording head in the direction of motion of said film blank and in operative relation thereto, an engraving head beside said pickup head and in operative relation to said film blank, and means supplying the output of said pickup head to said engraving head.

3. Sound recording apparatus comprising a film blank of transparent material having continuous parallel longitudinal strips, one of said strips being formed by an opaque coating and the other by a magnetically recordable coating, means for recording signals on said magnetic coating, means displaced therefrom for picking up and reproducing signals recorded on said magnetic coating, and means responsive to said reproduced signals for engraving an optical sound track in said opaque coating, said engraving means being located at the same position along said length of film blank and beside said reproducing means, and means for causing said film blank to traverse continuously a path from said magnetic recording means to said engraving and reproducing means at a substantially uniform speed.

4. Sound recording apparatus comprising a film blank of transparent material having continuous parallel longitudinal strips, one of said strips being formed by an opaque engravable coating and another by a magnetically recordable coating, means for magnetically recording signals on said magnetic coating, means displaced therefrom along said strips for picking up and reproducing said signals recorded on said magnetic coating, means responsive to said reproduced signals for engraving an optical sound track in said opaque coating, said engraving means being located at the same position along the length of said film blank as and beside said reproducing means, means for causing said film blank to traverse continuously a path from said magnetic recording means to said engraving and reproducing means, said engraving means comprising an engraving head having a stylus and means for moving said stylus and film blank relatively to each other in a direction transversely of said film blank in synchronism with said reproduced signals.

5. Optical sound track engraving apparatus for producing an optical sound track in a continuous film strip having a coating thereon, comprising an engraving head having a stylus and coil means for moving said stylus in a direction transversely of said film strip in synchronism with currents passing through said coil means, a source of audio signals to be recorded, and a noise reduction circuit connected between said source and said coil means, said circuit comprising a source of normal direct current bias providing a direct current through said coil means sufficient to maintain said stylus just in contact with said coating in the absence of audio signals, means for passing said audio signals to said soil means, and means continuously responsive to the average rectified value of said audio signals for correspondingly reducing said bias, whereby said optical track is wider for large amplitude signals than for small amplitude signals.

6. Optical sound track engraving apparatus for producing an optical sound track in a continuous film strip having a coating thereon, comprising an engraving head having a stylus and coil means for moving said stylus in a direction transversely of said film strip in synchronism with currents passing through said coil means, a source of audio signals to be recorded, and a noise reduction circuit connected between said source and said coil means, said circuit comprising a source of normal direct current bias providing a current through said coil means sufficient to maintain said stylus just in contact with said coating in the absence of audio signals, means for passing said audio signals to said coil means, and means responsive to the average rectified value of said audio signals for correspondingly reducing said bias, whereby said optical track is wider for large amplitude signals than for small amplitude signals, and further including means responsive to film breakage for abnormally increasing said bias to withdraw said stylus from contact with said coating.

7. Optical sound track engraving apparatus for producing an optical sound track in a continuous film strip having a coating thereon, comprising an engraving head having a stylus and coil means for moving said stylus in a direction transversely of said film strip in synchronism with currents passing through said coil means, a source of audio signals to be recorded, and a noise reduction circuit connected between said source and said coil means, said circuit comprising a source of normal direct current bias providing a direct current through said coil means sufficient to maintain said stylus just in contact with said coating in the absence of audio signals, means for passing said audio signals to said coil means, and means responsive to the average rectified value of said audio signals for correspondingly reducing said bias, whereby said optical track is wider for large amplitude signals than for small amplitude signals, and further including motor means for continuously traversing said film past said stylus, means for abnormally increasing said bias in the absence of energization of said motor means, and time delay means operable a predetermined time interval after energizing said motor means, for reducing said abnormal bias to said normal bias level.

8. Optical sound track engraving apparatus for producing an optical sound track in a continuous film strip having a coating thereon, comprising an engraving head having a stylus and coil means for moving said stylus in a direction transversely of said film strip in synchronism with currents passing through said coil means, a source of audio signals to be recorded, and a noise reduction circuit connected between said source and said coil means, said circuit comprising a source of normal direct current bias providing a direct current through said coil means sufficient to maintain said stylus just in contact with said coating in the absence of audio signals, means for passing said audio signals to said coil means, and means responsive to the average rectified value of said audio signals for correspondingly reducing said bias, whereby said optical track is wider for large amplitude signals than for small amplitude signals, and further including a heater coil surrounding said stylus.

9. Optical sound track engraving apparatus for producing an optical sound track on a continuous film strip having an opaque coating thereon, comprising an engraving head having a stylus and having electrical means for moving said stylus in a direction transversely of said film strip in contact with said coating and in synchronism with curents supplied to said electrical means, a source of audio signals to be recorded, means for supplying said audio signals to said electrical means to vary the depth of penetration of said stylus into said coating in correspondence with the amplitude of said signals, means for providing a normal bias current to said electrical means for determining the position of said stylus relative to said coating in the absence of said audio signals, and means responsive to slackening tension or breakage of said film strip for varying said bias to withdraw said stylus from contact with said coating.

10. Apparatus as in claim 9 further including motor means for continuously traversing said film past said stylus, means for abnormally changing said bias current in the absence of energization of said motor means to maintain said stylus out of contact with said film strip while said motor means is not energized, and time-delay means operable a predetermined time interval after energization of said motor means for changing said abnormal bias current to a normal bias current level permitting contact between said stylus and said film strip.

11. Optical sound track engraving apparatus for producing an optical sound track in a continuous film strip having a coating thereon, comprising an engraving head having a stylus and coil means for moving said stylus in a direction transversely of said film strip in synchronism with currents passing through said coil means, a source of audio signals to be recorded, circuit means connected between said source and said coil means for supplying said audio signals to said coil means, said circuit means also comprising means responsive to slackness of said film strip for supplying abnormal current to said coil means for moving said stylus out of contact with said film strip.

12. Optical sound track engraving apparatus for producing an optical sound track in a continuous film strip having a coating thereon, comprising an engraving head having a stylus and also having current-actuated means for moving said stylus in a direction transversely of said film strip, a source of audio signal to be recorded, a circuit connecting said source to said stylus, said circuit having means for providing a normal current to said stylus-moving means to maintain said stylus in contact with said coating, motor means for continuously driving said film strip past said stylus, said circuit also including means responsive to deenergizing of said motor means and to decrease in normal tension of said film strip, for supplying an abnormal current to said stylus-moving means for maintaining said stylus out of engagement with said film.

13. Apparatus for recording sound signals comprising means for magnetically recording sound signals on a moving magnetic recording medium, means for thereafter reproducing said recorded signals at a predetermined position along the path of said medium, and means responsive to said reproduced signals for producing on the same medium and at said predetermined position an optical sound track representative of said reproduced signals.

14. Apparatus for recording a plurality of sound signals comprising means for magnetically recording each of said signals on a moving magnetic medium in side-by-side relation, means thereafter simultaneously reproducing all said recorded signals at a predetermined position along the path of said medium, and means responsive to said reproduced signal for producing on said same medium and at said predetermined position an optical sound track representative of one or more of said reproduced signals.

15. Sound recording apparatus for producing a visual counterpart of a magnetic recording on a magnetically and optically recordable film blank, comprising means including a magnetic pickup head at a predetermined position along the path of said film blank and in operative relation thereto to produce electrical signals representative of a magnetic recording on said film blank, recording means in side-by-side relation to said pickup head transversely of said film blank and said predetermined position and in operative relation to said blank to produce an optical recording on said film blank of electrical signals supplied to said recording means, and means coupling said magnetic pickup head to said recording means to supply said produced electrical signals to said recording means.

References Cited in the file of this patent

UNITED STATES PATENTS

| | | |
|---|---|---|
| 2,034,111 | Miller | Mar. 17, 1936 |
| 2,479,868 | Rossmann et al. | Aug. 23, 1949 |
| 2,628,288 | Blaney | Feb. 10, 1953 |
| 2,658,951 | Albee | Nov. 10, 1953 |
| 2,712,573 | Vilbig | July 5, 1955 |

FOREIGN PATENTS

| | | |
|---|---|---|
| 618,349 | Great Britain | Feb. 21, 1949 |